Jan. 3, 1928.  1,654,563
A. C. TAYLOR
ELECTRICAL WELDING MACHINE
Filed Jan. 16, 1925   6 Sheets-Sheet 2
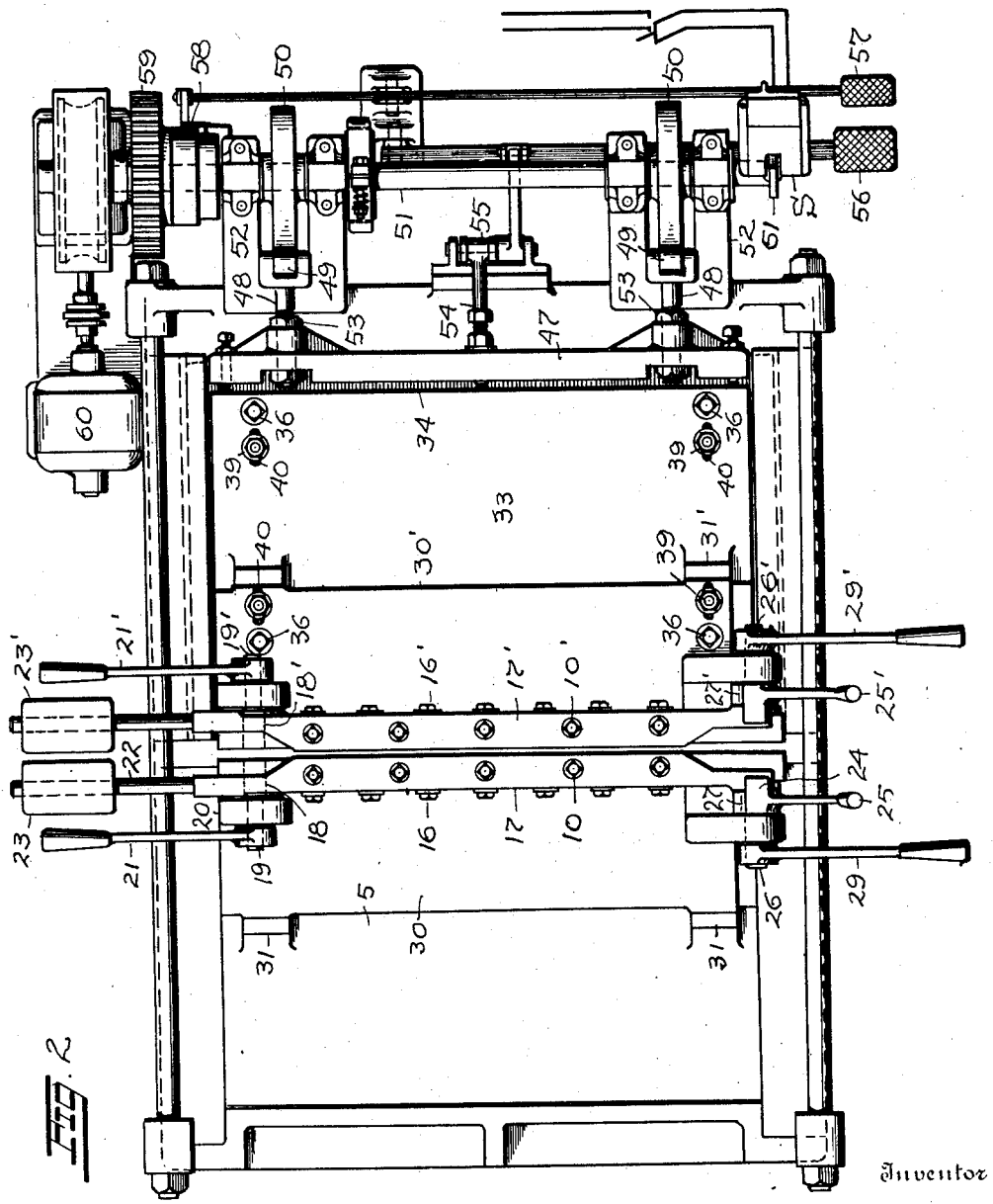
Inventor
A. C. TAYLOR
By Fisher Moser & Moore
Attorneys

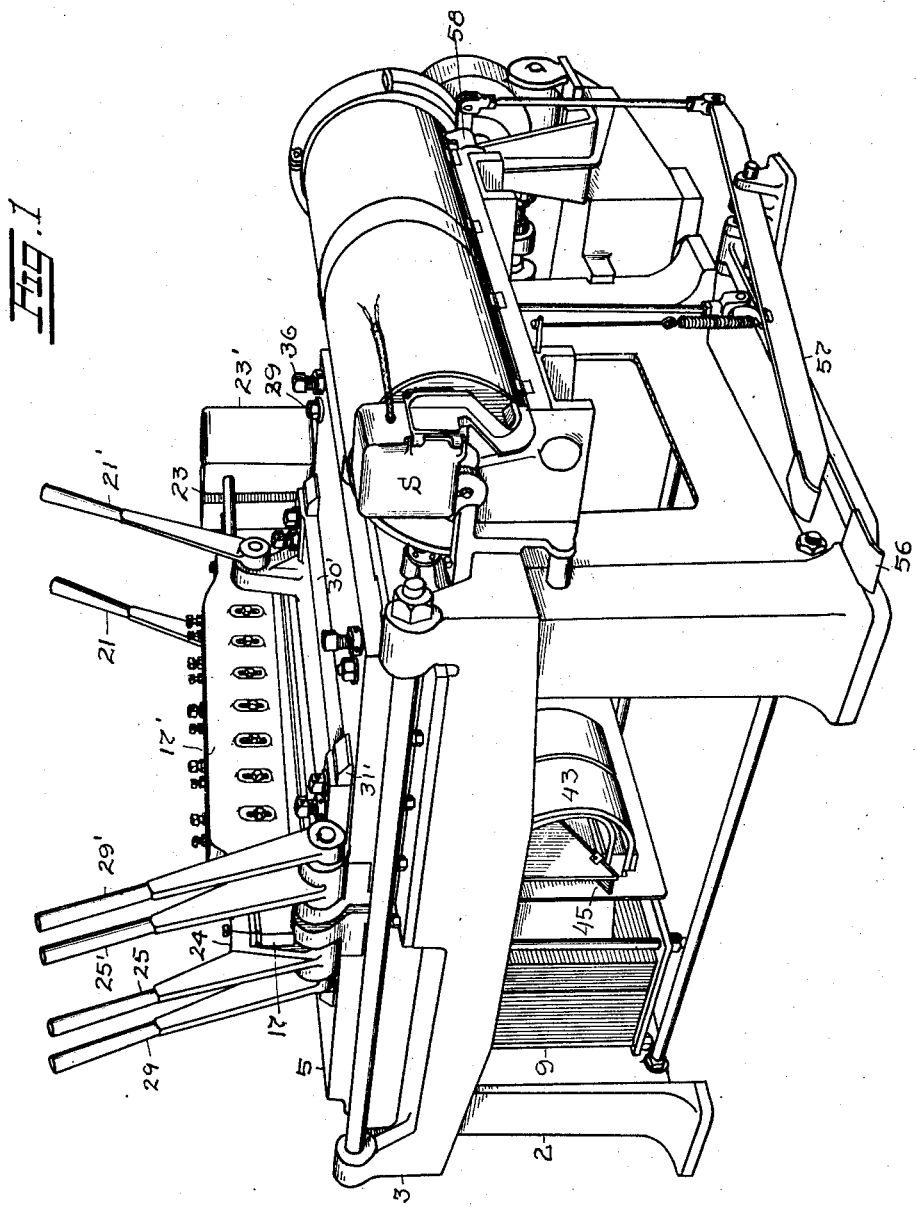

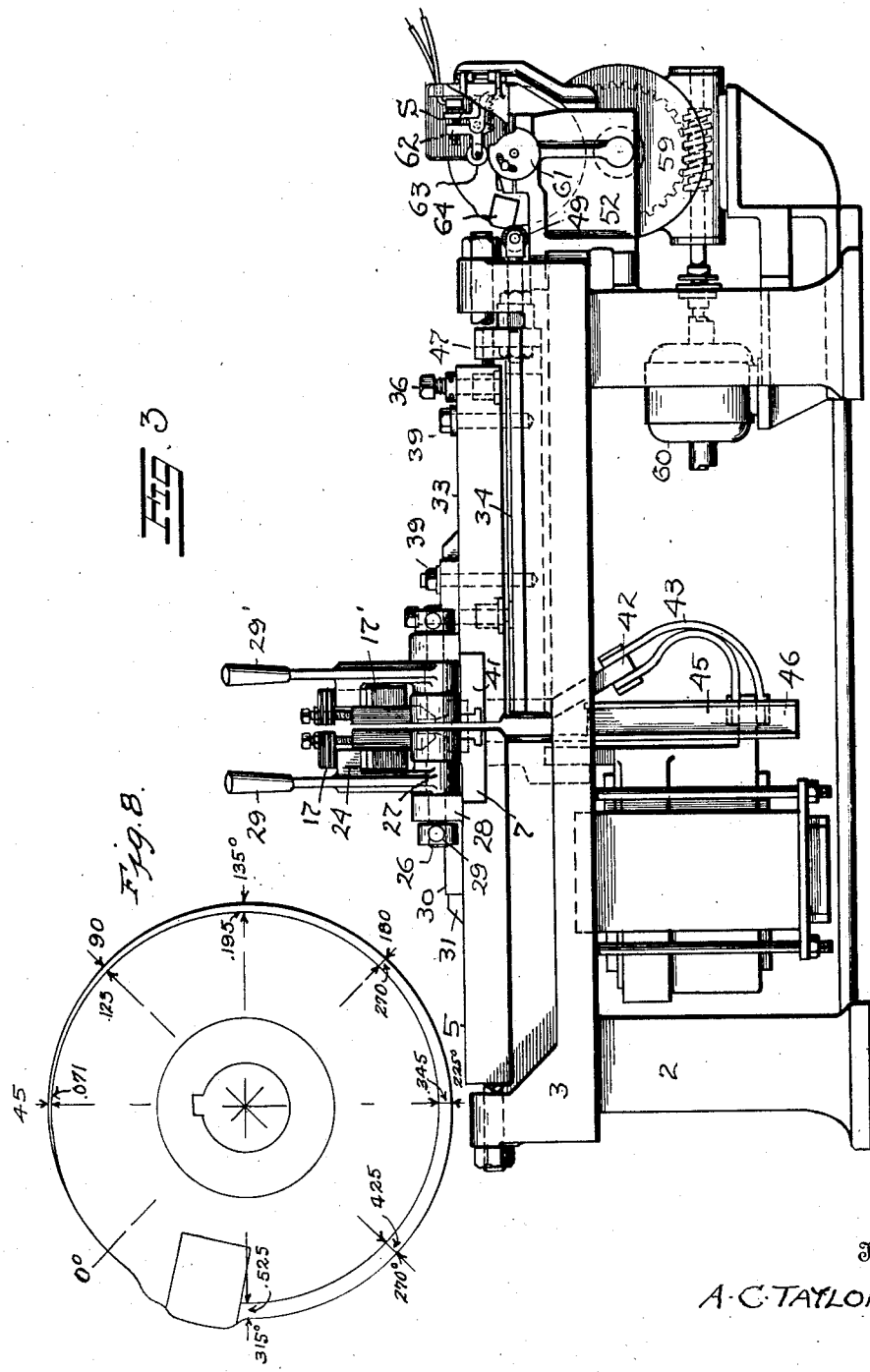

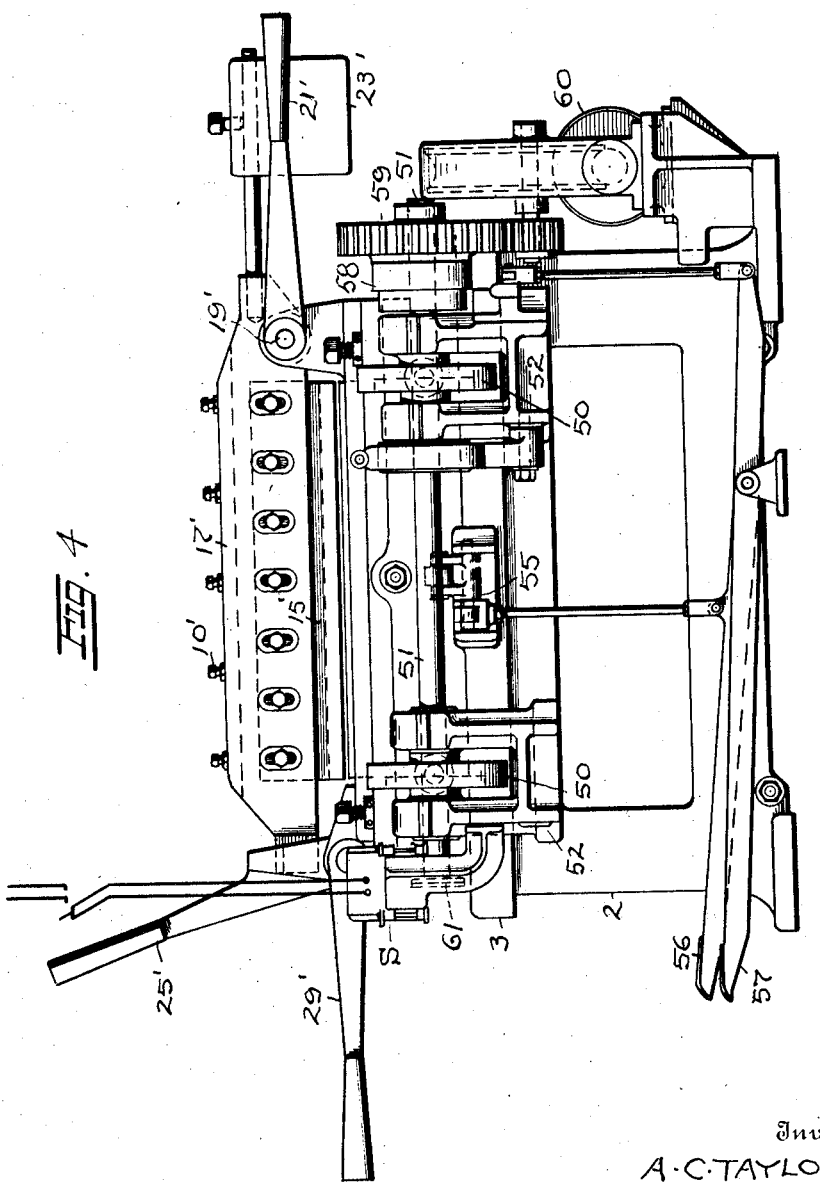

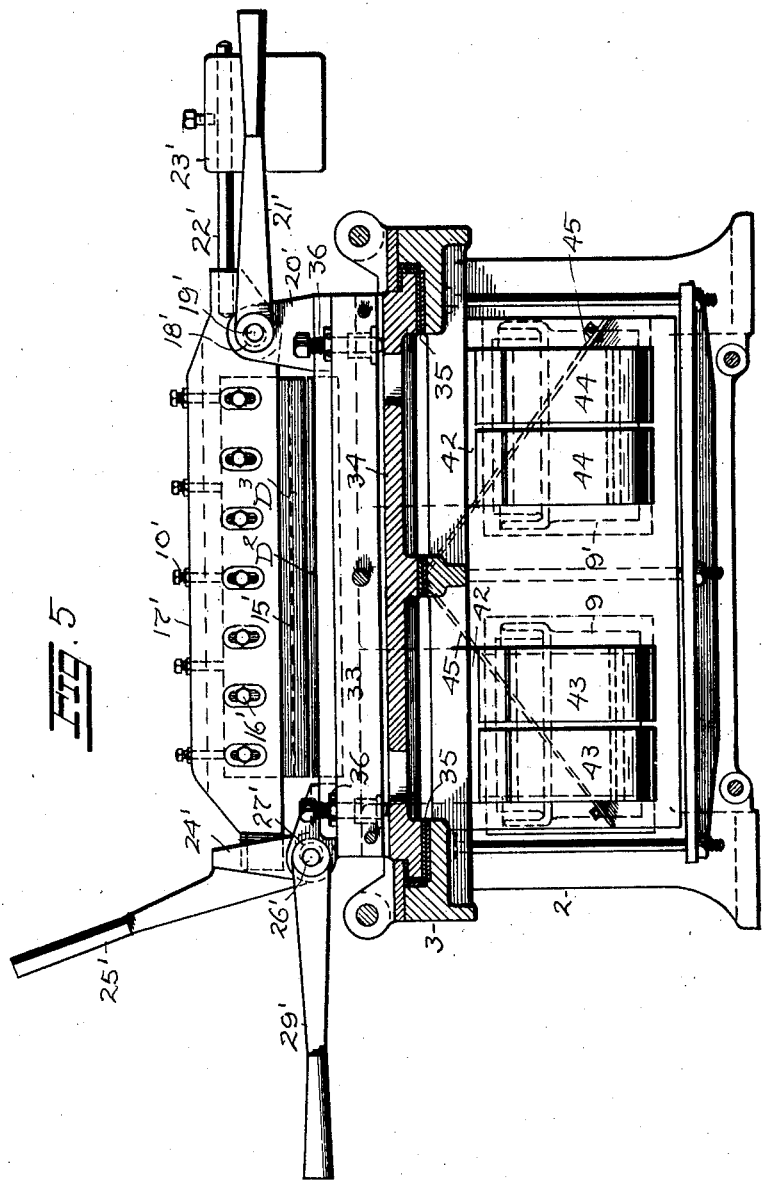

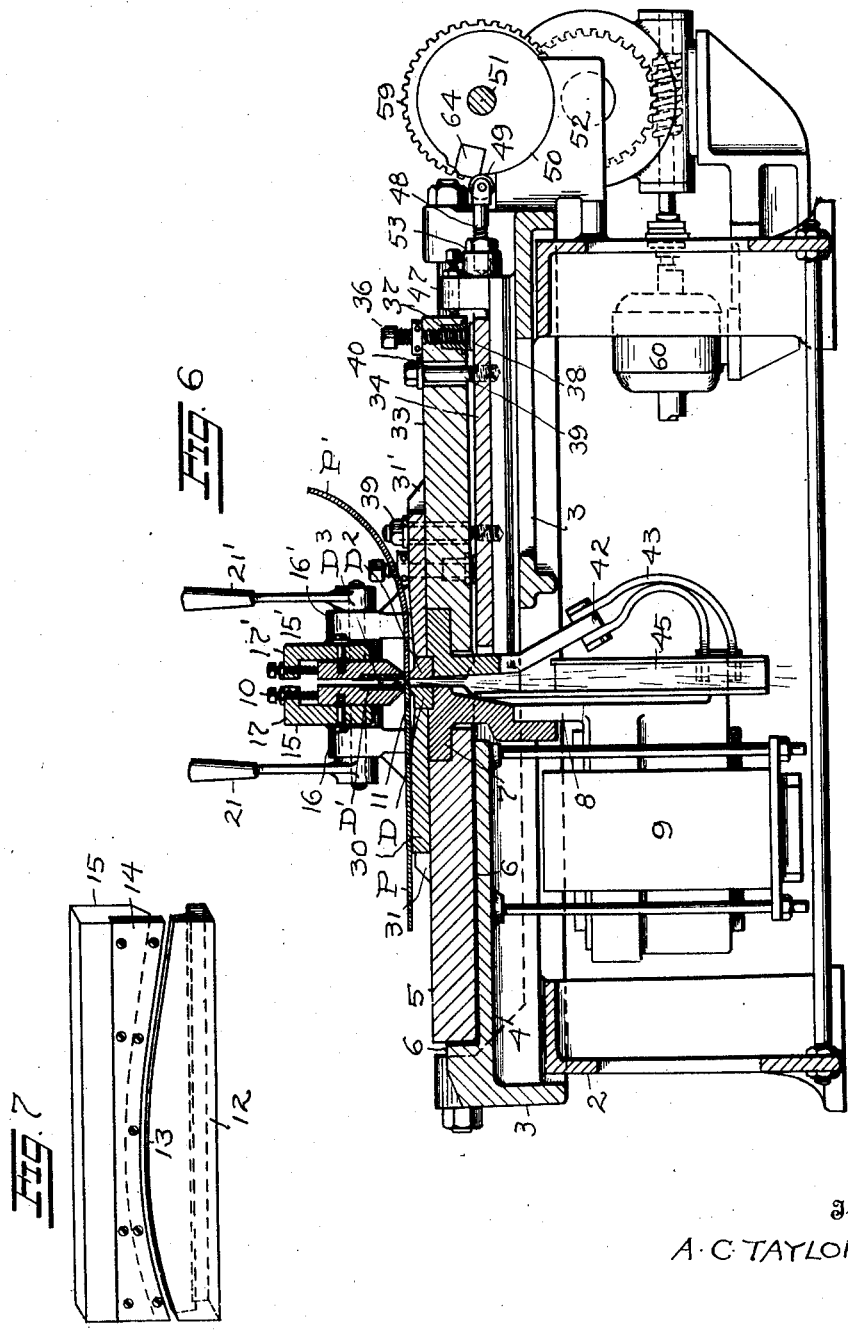

Patented Jan. 3, 1928.

1,654,563

UNITED STATES PATENT OFFICE.

ALBERTIS C. TAYLOR, OF WARREN, OHIO.

ELECTRICAL WELDING MACHINE.

Application filed January 16, 1925. Serial No. 2,713.

My invention relates to electrical welding machines, and my general object is to provide an automatic machine adapted to weld metal sheets or plates of large dimensions together. Thus, the machine as designed is adapted to weld the abutting edges of two relatively long sheets of metal together in a quick and effective way, and with such mechanical precision that a perfect seam may be produced without special dependence upon a skilled or expert operator during the actual welding proceeding. For example, separate large pieces or sections of an automobile body, such as the rear walls of a tonneau, an automobile cowl, or the walls of a steel barrel or tank, may be successfully welded together by this machine, utilizing combined flash and pressure methods of electrical welding under perfect mechanical control, the machine being especially constructed and arranged; first, to align thin sheets of any desired shape in edge abutting relation; second, to prevent the sheets from buckling and overlapping; third, to localize the electric welding current and heat; fourth, to bring the edges of the sheets together and to establish an electric arc the full length of said edges; fifth, to maintain this arc by a slow feed movement of one of the metal sheets; sixth, to produce a higher welding heat by increasing the rate of travel before upsetting; and seventh, to apply a heavy pressure to upset the fused metal while continuing the application of a welding current for a short period to cause further heating and upset of the material contiguous to the line of weld.

In the accompanying drawings, Fig. 1 is a perspective view of my improved welding machine. Fig. 2 is a top view of the machine. Fig. 3 is a front elevation, and Fig. 4 is an end view of the same machine. Fig. 5 is a vertical transverse section and Fig. 6 a longitudinal section of the machine. Fig. 7 is a perspective view of a pair of co-acting dies or electrodes for clamping, aligning and welding metal sheets together which are curved or embody curved edges to be butt welded. Fig. 8 is a front elevation of the cam member operating the sliding table; the change of the cam ratio being indicated by numerals giving every 45° the change in distance between cam center and cam surface.

As exemplified in the drawings the machine comprises a base frame 2 having a main top member 3 mounted thereon which has a raised seat 4 at one end for a normally stationary plate or table 5. Suitable insulating or electrical non-conducting material 6 insulates plate 5 from top 3, and a long copper bar 7 is secured to one rabbeted end of plate 5 to permit a short rigid connection to be made with corresponding terminal portions of the secondaries 8—8', of two, three or more electric welding transformers 9—9', see Figs. 5 and 6. In the present instance two transformers 9 and 9' are suspended in spaced juxtaposition beneath top member 3, one end of the secondary of each transformer being connected to the same conductor bar 7 to permit the requisite amount of electric welding current to be uniformly distributed to a relatively long copper die D detachably secured to the upper part of bar 7. This die may be of any desired shape, and in Fig. 5 I show a straight clamping flange or edge 11 on the die. In Fig. 7 I show a modified form of die 12 having an irregularly curved clamping and electric current conducting edge 13, and in this view I also show a complementary die plate 14 fixed to a heavier supporting plate 15.

In Fig. 6 the upper die plate D' is carried by a heavier plate 15' which is secured by bolts 16 to the slotted side wall of a flanged bar or clamping lever 17, and set screws 10 extend through the overhanging flange on lever 17 to resist the clamping pressure. Clamping lever 17 is pivotally supported upon the eccentric portion 18 of a rotatable shaft 19 which is journaled in a bracket 20 on plate 5 at one side of the machine; see Fig. 2. A hand lever 21 is used to rotate shaft 19 when a final set of the dies is desired. A rod 22 extends from the pivot end of clamping lever 17, and a counterweight 23 is adjustably secured to the shaft to facilitate lifting and lowering movements of the clamping lever and the upper die. The opposite end of clamping lever 17 is adapted to be engaged by a lateral projection 24 on a hand lever 25 when this lever is turned upwardly, and the hub portion of lever 25 is sleeved on an eccentric portion 27 of shaft 26 which is journaled in a fixed bracket 28 on table 5, see Figs. 2 and 3. A hand lever 29 is affixed to one end of shaft 26 to rotate the shaft and its eccentric when a final set in clamping operations is desired at this side of the machine. Thus, a large metal plate P, either flat or curved, may be firmly clamped at one edge between lower die D and upper die plate D', and in practice the edge of the sheet metal plate is projected a short distance beyond the exposed side faces of the clamping dies to permit flash-welding of the exposed stock at the beginning of welding operations. Plate P is clamped firmly and effectively the entire length of the edge to be welded and a uniformly good electrical contact is obtained at all places, inasmuch as the opposite ends of the clamping bar or lever 17 may be independently depressed by means of the hand levers 21 and 29 which operate the respective pivot shafts and eccentrics for such levers. This arrangement permits effective welding operations to proceed on large sheets of metal handled by two men stationed on opposite sides of the machine.

A separate plate 30 is seated flush upon the top of table 5 and bar 7 between lower die D and a pair of spaced backing lugs 31 on the table, and this plate 30 provides a support or rest for the sheet being welded and also serves as a thrust member to relieve the upsetting pressure in welding operations on lower clamping die D. The top surface of thrust member 30 may be flat or curved or otherwise shaped to correspond to the shape of the sheet being operated upon, and this member is preferably a removable and interchangeable part of the machine, together with the welding dies.

The clamping and welding parts described deal with only one of the sheets P to be welded, that is, the sheet which is clamped in a stationary position on the elevated half of top 3. The other sheet P' is clamped between another set of dies D² and D³ which are movably related to the first set, but the clamping and holding parts for the second set of dies are merely duplicates of the clamping and holding parts for the first set. Corresponding parts are therefore marked with corresponding numerals, which are marked with a prime to differentiate, thereby avoiding repetition in description. The main difference rests in mounting the second set of dies and their clamping parts upon a table 33 adjustably fixed to a slide 34 which is seated for longitudinal movement on steel face plates 35 in the channeled or depressed half of top 3. Sheet P' may be flat or curved, but the edge to be welded must be aligned accurately with the abutting edge of stationary sheet P. It therefore becomes necessary in many instances to raise or lower table 33 in respect to stationary table 5 and also to tilt it perhaps. Table 33 is therefore provided with vertical set screws 36 which extend through steel bushings 37 into bearing engagement with steel plates 38 on slide 34 to permit the table to be raised or lowered and to be tilted or inclined horizontally within limits. Clamping bolts 39 fix table 33 in its adjusted position, and slots 40 for the bolts permit table 33 to be adjusted longitudinally of the slide to increase or decrease the working distance between the two sets of opposed dies. Table 33 has a current conducting bar 41 affixed at one end to seat lower die D² and two or more inclined arms 42 depend therefrom at spaced intervals to permit the flexible conductors 43 and 44 of the secondaries of the two transformers 9 and 9', to be connected thereto. A walled chute 45 having an inclined bottom 46 is supported beneath and in line with the welding space between the welding dies to receive and deflect the particles thrown off during flash-welding operations, thereby protecting the transformers and delivering the particles to opposite sides of the machine. It has been difficult, heretofore, to produce butt welds without faults in two thin sheets of metal of substantial width, say a butt weld approximately two to three feet long, and to obtain uniform welding results repeatedly in large sheets under quantity production conditions, such as prevail for example in building sheet metal automobile bodies, cowls, etc. The present machine is designed to weld large sheets together quickly, efficiently and with uniform results, without dependence upon the uncertainties of manual control in the actual welding operations, and to that end the machine is constructed to time and control the movement of slide 34 automatically and in a variable manner from the beginning to the end of the welding operation. The steps taken in welding, after the two sheets of metal have been aligned edge to edge in separated relation, consist of bringing the edge of one sheet into close contiguity with the edge of the other sheet and in passing an electric welding current through the plates until arcing is effected. Continuous arcing between the plates is then produced by feeding the movable plate slowly forward without closing the arcing gap entirely, the movement being timed to maintain the right spacing as the heated edges fuse and the particles flash off. The material contiguous to the fusing and flashing edges is thus brought to a welding temperature very quickly, and it is then upset by bringing the two metal plates together suddenly under considerable pressure without switching off the electric current. Henceforth, the welding proceeds under pressure welding conditions, both the pressure and the passing of a welding current being continued for a fixed interval until all the interstices and minute spaces between the long sheets are closed and a continuous weld is obtained. The electric current is then switched off automatically and the pressure also relieved automatically to permit the welded sheets to be removed from the machine.

The successive steps of welding as described are effected entirely by automatically operated means. Thus, slide 34 is formed with an upwardly-extending flange 47 at its outer end, and a pair of screw-threaded rods 48 extend horizontally therefrom and carry rollers 49 at their outer ends which are adapted to be separately engaged by a pair of cams 50 fixed in spaced relation on a cam shaft 51 journaled in suitable brackets 52 forming part of the main frame or top member 3. Rods 48 are adjustably secured to slide 34 by nuts 53 to facilitate proper settings for imparting the same movement and equal pressure to the slide opposite the spaced cams.

A centrally situated rod 54 couples the slide to a bell crank 55 which is connected to a foot pedal 56 to permit the operator at the beginning of operations to move the slide outwardly until the rollers 49 engage the lowest points on the cams. A second foot treadle 57 controls a suitable clutch 58 adapted to connect cam shaft 51 with gearing 59 operated continuously by an electric motor 60. The type of clutch used permits the cam shaft to make a single revolution, the clutch being thrown out of action when the cam is in the same position as at the beginning. Such clutches being commonly known to those skilled in the arts, a detailed showing and description thereof appears superfluous, and is omitted.

Cam shaft 51 also carries an adjustable disk cam 61 at one end which is adapted to close an electric switch S and to hold it closed for a predetermined interval during the forward movement of slide 34. This switch comprises a spring-controlled switch arm 62 having a roller 63 in riding engagement with cam 61, but any other form of switch adapted to switch the current on and off at timed intervals may be used. In the present machine cam disk 61 is adjusted to switch on the electric current after the cam shaft has started to revolve and the slide has moved forwardly a sufficient distance to bring the edges of the sheet metal into arcing relation. As the cam shaft continues to revolve slowly the cams 50 control the movement of the slide to effect constant arcing conditions at the opposed edges of the stationary and movable sheets of metal under treatment. In due time the edge portions reach a welding condition and then the pressure rollers 49 on the slide are suddenly engaged by a hardened inset section 64 in the edge of the cam to bring the heated edges together with upsetting force. The cam face of inset section 64 may be shaped to augment the upsetting pressure, and in any event, is of such arcuate shape and size that a substantial pressure is maintained for an interval while the electric current continues to flow through the upset and partially welded edges of the sheet, the purpose being to complete the weld by a continued heating of the contacting areas under pressure until every opening and interstice is closed and a perfect linear weld is obtained. In that connection it should be understood that thin wide sheets when abutted and subjected to flash welding operations will burn irregularly at the meeting edges and the edges may be wider apart at one point than another. Therefore, the edge portions of the sheets must be brought initially to a welding temperature at all points the full length thereof and this welding temperature and a continued application of pressure must be maintained after the initial upset of the edges, especially in thin and wide sheets, in order that every gap and space in the irregular edges may be closed. The flow of electric welding current must also be distributed with uniform heating effect throughout the length of the edges of the wide sheets to be welded, and I distribute this current in an operative way by connecting a plural number of transformers to a pair of clamping dies or electrodes having the same length or a greater length than the edge portions of the sheets to be welded together. As an example of the results which may be obtained with my improved machine and method, two sheets of steel of sixteen gauge having straight or curved edges one to four feet in length may be welded together with a water tight seam in five seconds.

In welding two thin sheets together, the weld itself takes place very close to the clamping dies so that the thin sheets will align edge to edge and not buckle or slip past and overlap each other, and by making the weld close to the dies the heat is also prevented from running back from the edges of the sheets. The upsetting cams are made to give a very slow rate of travel when arcing first takes place, but after the arc is established and the ends of the sheets are heated the rate of travel is increased until upsetting occurs. The slow rate of travel at first assures arcing and the increase in travel produces a higher welding heat. The heavy upsetting pressure which is maintained with the application of the electric current for a short period causes further heating and upsetting of the sheets at the point of weld, which assures that all pin holes are closed and a weld of full strength is effected.

What I claim, is:

1. An electric welding machine adapted to butt weld two thin and wide sheets of metal together automatically, comprising means adapted to clamp and hold the sheets of metal in abutting relation at their edges, means adapted to move the edges of said sheets slowly but with increasing speed toward each other, means adapted to pass an electric welding current through said edges to produce electric arcing thereat for a predetermined interval, means adapted to force said arced edges together with an upsetting pressure for a fixed interval, and means adapted to continue the flow of the electric heating current through the edges of said plates while applying the upsetting pressure.

2. An electric welding machine adapted to butt weld two thin and wide sheets of metal together automatically, comprising devices adapted to clamp and hold two sheets of metal in movable abutting relation, automatic means adapted to apply an electric heating current with continuous arcing effect at the opposing edges of said sheets by a variable speed movement of one sheet in respect to the other sheet, and automatic means adapted to upset said arced edges and to maintain a pressure thereon while continuing the application of said electric heating current.

3. A machine adapted to butt weld wide sheets of metal together, comprising a set of co-acting welding dies, a reciprocable support for a die, mechanism adapted to move said support to bring the co-acting dies slowly and with increasing speed after an arc has been established together, including means adapted to impart a sudden and continued upsetting movement to the dies and the work under treatment.

4. A machine adapted to butt weld wide sheets of metal together, comprising a set of co-acting welding dies having clamping means for holding the sheets in abutting relation, mechanism adapted to bring said dies and the edges of the sheet closely together, means adapted to switch on an electric welding current through said dies to effect arcing at the opposed edge portions of the sheets, a device adapted to upset the arced edges of said sheets automatically, and said switching means being arranged to maintain a flow of electric current for a fixed interval subsequent to the operation of said upsetting device.

5. A machine adapted to butt weld wide sheets of metal together, comprising a set of co-acting welding dies adapted to pass an electric current to the sheets to be welded, a movable support for one of said dies, cams adapted to move said support slowly but with increasing speed after an arc between the ends of said sheets has been established, and an electric switch associated with said cams and adapted to switch an electric welding current on and off automatically coincident with the movement imparted to said support by said cams.

6. A machine adapted to butt weld the relatively long edges of two wide sheets of metal together, comprising a set of co-acting welding dies for conveying current to the entire length of the edges of the sheets, a rotatable shaft having a plurality of cams adapted to move said dies and sheets toward each other with increasing speed after an arc between the ends of said sheets has been established and then with an upsetting pressure, clutch mechanism adapted to control the rotative movements of said shaft and cams, and an electric switch adapted to control the electric current passing to said dies having operative connection with said cam and clutch mechanism.

7. A machine adapted to butt weld wide sheets of metal together, comprising a table having a pair of elongated co-acting dies mounted thereon, one of said dies having a supporting member pivotally mounted to permit it to be turned upwardly, and eccentric means and hand levers at opposite ends of said member adapted to effect separate clamping movements at opposite ends of said dies.

8. A method of producing electrical butt welds in wide sheets of thin metal, consisting in passing an electric heating current through the edge portions of the sheets of metal and effecting continuous arcing therebetween until the contiguous areas are brought to a welding condition, in bringing the heated edges together and upsetting the weld by the application of pressure, and in continuing the application of pressure and the electric heating current subsequent to upsetting until all the interstices are closed and a homogeneous welded seam is effected the full length of said edges.

9. A method of producing electrical butt welds in wide sheets of thin metal, consisting in passing an electric heating current through the edge portions of the sheets of metal when brought together and effecting continuous arcing therebetween; in moving said edge portions slowly and with increasing speed toward each other until the rate of speed is equal to the burning off of said edges by said arc; in bringing the heated edges together; and then suddenly upsetting the weld by the application of pressure.

10. A method of producing electrical butt welds for a substantial distance linearly in wide sheets of thin metal, consisting in passing an electric heating current through the edge portions of the sheets of metal brought together and effecting continuous arcing therebetween; in moving said edge portions slowly and with increasing speed toward each other until the rate of speed is equal to the burning off of said edges by said arc; in bringing the heated edges together and upsetting the weld by the application of pressure; and in continuing the application of pressure and the electric heating current subsequent to upsetting until all the interstices are closed and a homogeneous welded seam is effected the full length of said edges.

11. A machine adapted to butt weld wide sheets of metal together, comprising sets of welding dies, a rigid support for one set of said dies, a movable support for the other set of said dies and rotatable cams adapted to move said movable support slowly but with variable speed parallel towards the other support.

In testimony whereof I affix my signature.

ALBERTIS C. TAYLOR.